United States Patent
Matsui

(10) Patent No.: US 11,528,406 B2
(45) Date of Patent: Dec. 13, 2022

(54) CONTROL APPARATUS, IMAGE PICKUP APPARATUS WHICH CHANGES AN AUTOFOCUS OPERATION BASED ON A RATIO OF A NUMBER OF LOW CONTRAST FRAMES TO A NUMBER OF FOCUS DETECTING FRAMES

(71) Applicant: CANON KABUSHIKI KAISHA, Tokyo (JP)

(72) Inventor: Yohei Matsui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/231,987

(22) Filed: Apr. 15, 2021

(65) Prior Publication Data

US 2021/0337130 A1 Oct. 28, 2021

(30) Foreign Application Priority Data

Apr. 22, 2020 (JP) .............................. JP2020-076366

(51) Int. Cl.
*H04N 5/232* (2006.01)
*H04N 5/225* (2006.01)

(52) U.S. Cl.
CPC ... *H04N 5/232123* (2018.08); *H04N 5/22525* (2018.08)

(58) Field of Classification Search
CPC ......... H04N 5/232123; H04N 5/22525; H04N 5/232122; H04N 5/232945; H04N 5/232127
See application file for complete search history.

(56) References Cited

U.S. PATENT DOCUMENTS

| | | | |
|---|---|---|---|
| 9,131,145 B2 * | 9/2015 | Hamano | ............ H04N 5/23219 |
| 2017/0054893 A1 * | 2/2017 | Kudo | ............... H04N 5/232122 |
| 2017/0289439 A1 * | 10/2017 | Miyazawa | ....... H04N 5/232945 |

FOREIGN PATENT DOCUMENTS

| | | |
|---|---|---|
| JP | H8-015603 A | 1/1996 |
| JP | 2001-021794 A | 1/2001 |
| JP | 2019-184956 | * 10/2019 |

* cited by examiner

*Primary Examiner* — Luong T Nguyen
(74) *Attorney, Agent, or Firm* — Canon U.S.A., Inc. IP Division

(57) ABSTRACT

An apparatus includes a calculation unit that calculates a plurality of defocus amounts corresponding to a plurality of focus detecting frames obtained by dividing an area corresponding to a display frame, and a selection unit that selects one focus detecting frame which corresponds to one defocus amount used for an AF control. The selection unit changes an AF operation for selecting the one focus detecting frame based on the number of low contrast frames to the number of focus detecting frames or based on reliability selected from part of the area and a ratio of focus detecting frames having a high reliability in the area, or performs an AF operation for selecting the one focus detecting frame so that a high contrast frame is prioritized over a low contrast frame.

16 Claims, 13 Drawing Sheets

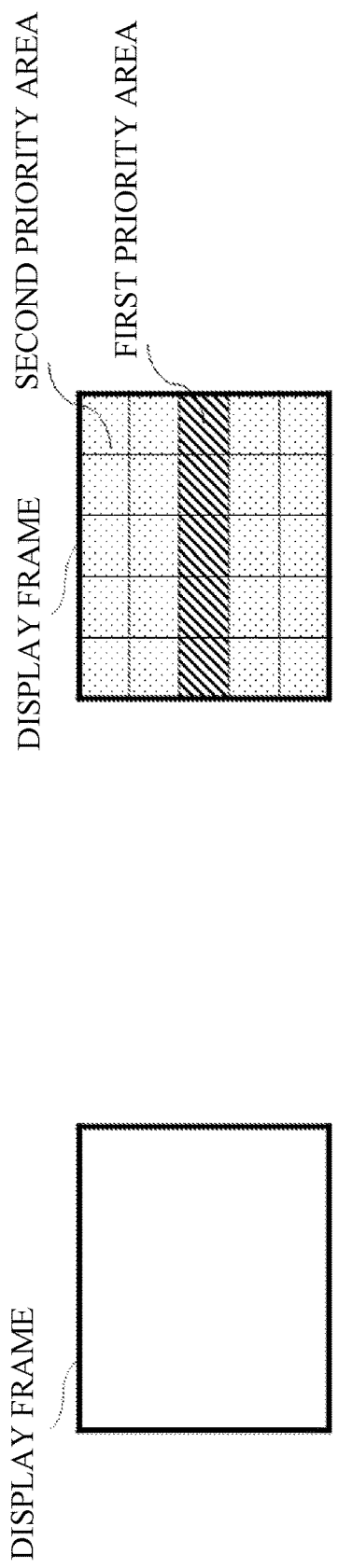
FIG. 4A
FIG. 4B
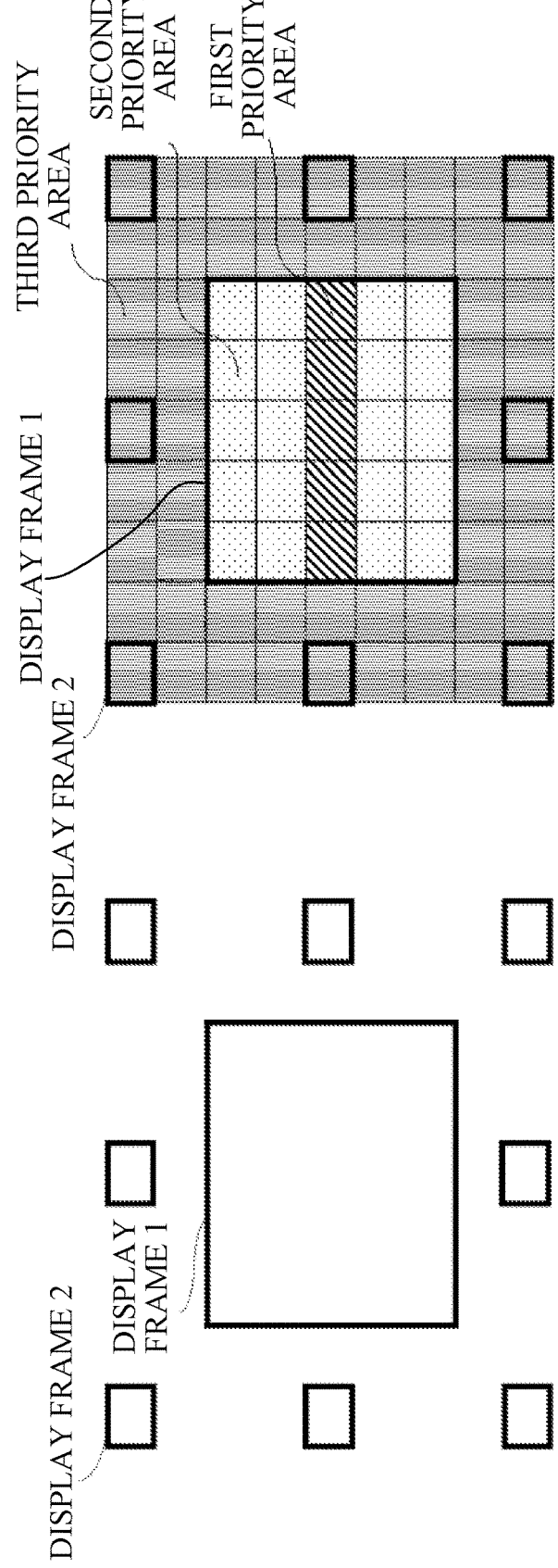
FIG. 4C
FIG. 4D

CONTROL APPARATUS, IMAGE PICKUP APPARATUS WHICH CHANGES AN AUTOFOCUS OPERATION BASED ON A RATIO OF A NUMBER OF LOW CONTRAST FRAMES TO A NUMBER OF FOCUS DETECTING FRAMES

FIELD OF THE DISCLOSURE

The aspect of the embodiments relates to a control apparatus, an image pickup apparatus, a control method, and a storage medium.

DESCRIPTION OF THE RELATED ART

Japanese Patent Laid-Open No. ("JP") 2001-021794 discloses a method that regards a plurality of past changes of an image plane position as a predetermined temporal function, calculates the function, and performs moving object prediction driving of an imaging lens. JP 8-015603 discloses a method of dividing a pair of electric signal sequences used for focusing into a plurality of blocks, of calculating a defocus amount for each block, and for determining a perspective competition for each block.

However, as disclosed in JP 8-015603, when a focus detecting point is divided into division blocks and becomes smaller, an S/N ratio lowers, so that the focus detecting result is likely to significantly scatter in a low luminance or low contrast state. Therefore, it is difficult to perform a stable autofocus (AF) operation in executing the method disclosed in JP 2001-021794.

SUMMARY OF THE DISCLOSURE

An apparatus includes a calculation unit configured to calculate a plurality of defocus amounts corresponding to a plurality of focus detecting frames obtained by dividing an area corresponding to a display frame, and a selection unit configured to select one focus detecting frame from among the plurality of focus detecting frames, which corresponds to one defocus amount used for an AF control. The selection unit changes an AF operation for selecting the one focus detecting frame based on a ratio of the number of low contrast frames to the number of the plurality of focus detecting frames, or performs an AF operation for selecting the one focus detecting frame so that a high contrast frame is prioritized over a low contrast frame.

An apparatus includes a calculation unit configured to calculate a plurality of defocus amounts corresponding to a plurality of focus detecting frames obtained by dividing an area corresponding to a display frame, and to calculate a reliability for each of the plurality of defocus amounts, and a selection unit configured to select one of the plurality of focus detecting frames which corresponds to one defocus amount used for an AF control. The area corresponding to the display frame has at least two priority areas that include a first priority area and a second priority area. The selection unit changes an AF operation for selecting the one focus detecting frame, when the reliability selected from the first priority area is lower than a predetermined reliability, and a ratio of focus detecting frames each having the reliability higher than the predetermined reliability included in the area corresponding to the display frame is equal to or higher than a predetermined ratio.

Further features of the disclosure will become apparent from the following description of exemplary embodiments with reference to the attached drawings.

BRIEF DESCRIPTION OF THE DRAWINGS

FIGS. 4A to 4D illustrate an example of a display frame, a focus detecting frame, and a priority area according to each embodiment.

DESCRIPTION OF THE EMBODIMENTS

Figure 1:
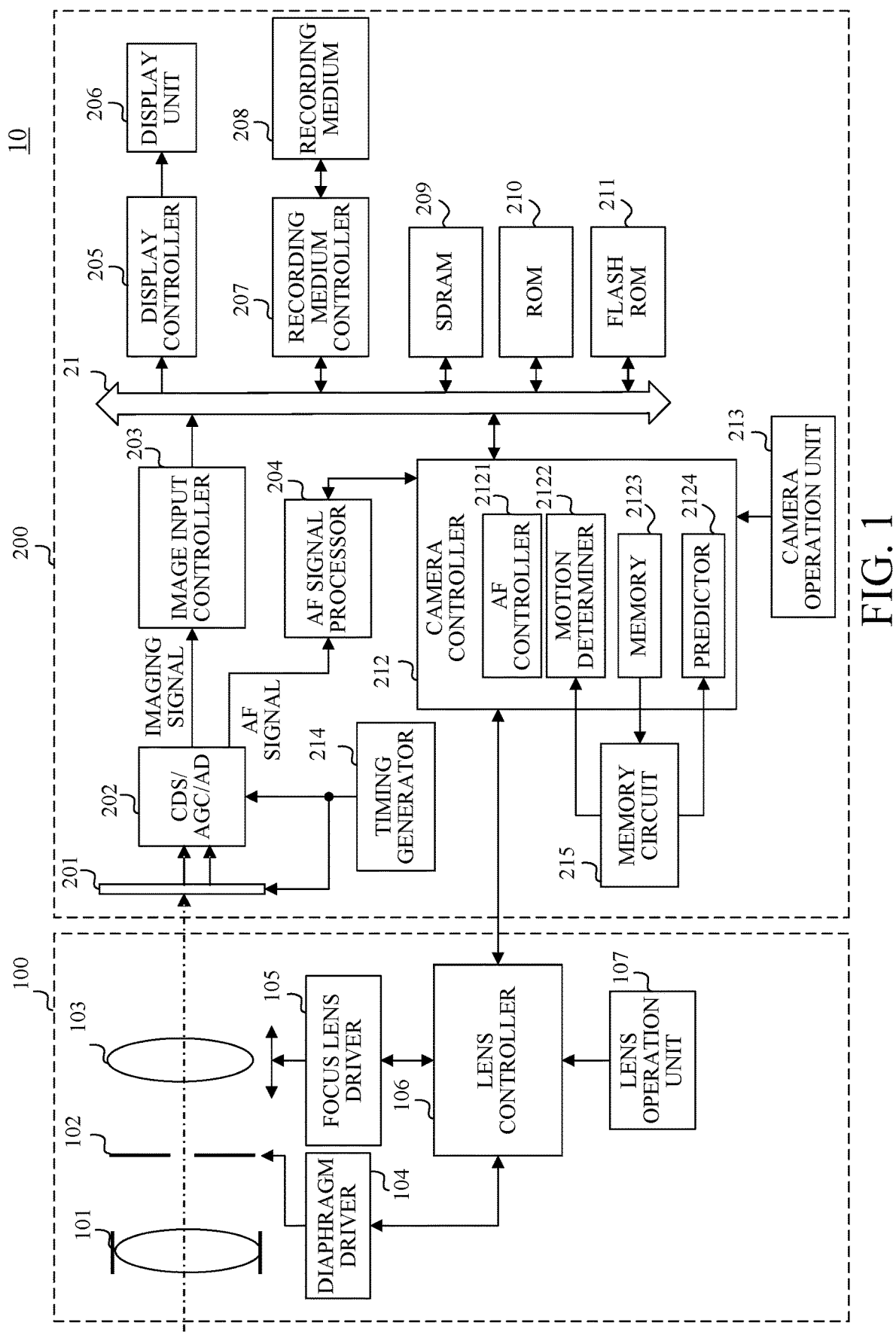
FIG. 1 is a block diagram of an image pickup apparatus according to each embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

Referring now to FIG. 1, a description will be given of an image pickup apparatus according to a first embodiment of the disclosure. FIG. 1 is a block diagram of an image pickup apparatus (interchangeable lens camera, camera system) 10. The image pickup apparatus 10 includes a camera body (image pickup apparatus body) 200 and a lens unit (lens apparatus) 100 that is attachable to and detachable from (interchangeable from) the camera body 200. However, this embodiment is not limited to this example, and is applicable to an image pickup apparatus in which a camera body and a lens unit are integrated with each other.

The lens unit 100 has a lens controller 106 that controls an overall operation of the lens unit 100. The camera body 200 has a camera controller 212 that controls an overall operation of the image pickup apparatus 10 including the lens unit 100. The lens controller 106 and the camera controller 212 can communicate with each other through terminals provided on a lens mount.

A description will now be given of the configuration of the lens unit 100. A fixed lens 101, a diaphragm (aperture stop) 102, and a focus lens 103 constitute an imaging optical system. The diaphragm 102 is driven by a diaphragm driver 104 and controls a light amount incident on an image sensor 201, which will be described later. The focus lens 103 is driven by a focus lens driver 105, and a focal length of the imaging optical system changes according to the position of the focus lens 103. The diaphragm driver 104 and the focus lens driver 105 are controlled by the lens controller 106, and determine the aperture amount of the diaphragm 102 and the position of the focus lens 103, respectively.

A lens operation unit 107 is an input device group for a user to make settings relating to the operation of the lens unit 100. Operating the lens operation unit 107 can switch an AF (autofocus)/MF (manual focus) mode, adjust the position of the focus lens 103 by the MF, set an operating range of the focus lens 103, and set an image stabilization mode. The lens controller 106 provide control according to the lens operation unit 107 operated by the user.

The lens controller 106 controls the diaphragm driver 104 and the focus lens driver 105 according to a control command and control information received from the camera controller 212, which will be described later. The lens controller 106 transmits lens control information to the camera controller 212.

Next follows a description of the configuration of the camera body 200. The camera body 200 is configured to acquire an imaging signal from a luminous flux that has passed through the imaging optical system in the lens unit 100.

An image sensor 201 includes a CCD sensor and a CMOS sensor, and photoelectrically converts an optical image formed via the imaging optical system in the lens unit 100. That is, the luminous flux incident from the imaging optical system is imaged on the light receiving plane of the image sensor 201, and converted into a signal charge according to the incident light amount by photodiodes provided in the pixels arranged in the image sensor 201. The signal charge accumulated in each photodiode is sequentially read out of the image sensor 201 as a voltage signal corresponding to the signal charge in synchronization with a driving pulse output from a timing generator 214 according to the command from the camera controller 212.

In this embodiment, each pixel in the image sensor 201 has two (pair) photodiodes A and B and one microlens for the pair of photodiodes A and B. Each pixel divides incident light with the microlens to form a pair of optical images on a pair of photodiodes A and B, and the pair of photodiodes A and B output a pair of pixel signals (A signal and B signal) used for an AF signal described later. An imaging signal (A+B signal) can be obtained by adding the outputs from the pair of photodiodes A and B.

A pair of image signals as the AF signals (focus detection signals) are obtained used for the AF (imaging plane phase difference AF) based on the imaging plane phase difference detecting method by combining a plurality of A signals output from a plurality of pixels with one another and by combining a plurality of B signals output from a plurality of pixels with each other. An AF signal processor 204, which will be described later, performs a correlation calculation for the pair of image signals, calculates a phase difference (image shift amount) which is a shift amount between the pair of image signals, and calculates a defocus amount (and a defocus direction) of the imaging optical system from the image shift amount.

A CDS/AGC/AD converter 202 performs correlated double sampling for removing a reset noise, a gain control, and an AD conversion for the AF signal and the imaging signal read out of the image sensor 201. The CDS/AGC/AD converter 202 outputs the imaging signal and the AF signal that have undergone these processes to an image input controller 203 and the AF signal processor 204, respectively.

The image input controller 203 stores as an image signal the imaging signal output from the CDS/AGC/AD converter 202 in an SDRAM 209 via a bus 21. The image signal stored in the SDRAM 209 is read by a display controller 205 via the bus 21 and displayed on the display unit 206. In a recording mode for recording the image signal, the image signal stored in the SDRAM 209 is recorded in a recording medium 208 such as a semiconductor memory by a recording medium controller 207. A ROM 210 stores a control program and a processing program executed by the camera controller 212, various data for their execution, and the like. A flash ROM 211 stores various setting information and the like relating to the operation of the camera body 200 set by the user.

The AF signal processor (focus detecting apparatus) 204 performs a correlation calculation for a pair of image signals which are AF signals output from the CDS/AGC/AD converter 202, and calculates the image shift amount between the pair of image signals and the reliability. The reliability is calculated using a coincidence degree between two images and the steepness of a correlation changing amount. The AF signal processor 204 sets the position and size of the focus detecting area, which is an area used for the focus detection and AF in the imaging screen. The AF signal processor 204 outputs an image shift amount (detection amount) and reliability information calculated in the focus detecting area to the camera controller 212.

The camera controller 212 includes an AF controller 2121, a motion determiner 2122, a memory 2123, and a predictor 2124. The AF controller 2121 instructs the lens controller 106 to move a focus position based on the converted defocus amount. The motion determiner 2122 determines a motion based on the imaging time stored in a memory circuit 215 by a memory 2123 and an object image plane position calculated from the defocus amount. The AF controller 2121 predicts a future image plane position using the predictor 2124, calculates a lens driving amount required for the focus lens 103 to reach the predicted image plane position, and instructs the lens controller 106.

The camera controller 212 controls each component while exchanging information with each component in the camera body 200. The camera controller 212 performs various processing in accordance with an input from the camera operation unit 213 based on user operation, such as powering on and off, changing various settings, imaging processing, AF processing, and reproduction processing of a recorded image. The camera controller 212 transmits a control command to the lens unit 100 (lens controller 106) and information on the camera body 200 to the lens controller 106, and acquires information on the lens unit 100 from the lens controller 106. The camera controller 212 includes a microcomputer and controls the entire image pickup apparatus 10 including the lens unit 100 by executing a computer program stored in the ROM 210.

The camera controller 212 calculates the defocus amount using the image shift amount in the focus detecting area calculated by the AF signal processor 204, and controls driving of the focus lens 103 through the lens controller 106 based on the defocus amount. A description will now be given of processing performed by the camera body 200. The camera controller 212 performs the following processing according to an imaging processing program which is a computer program.

Figure 2:
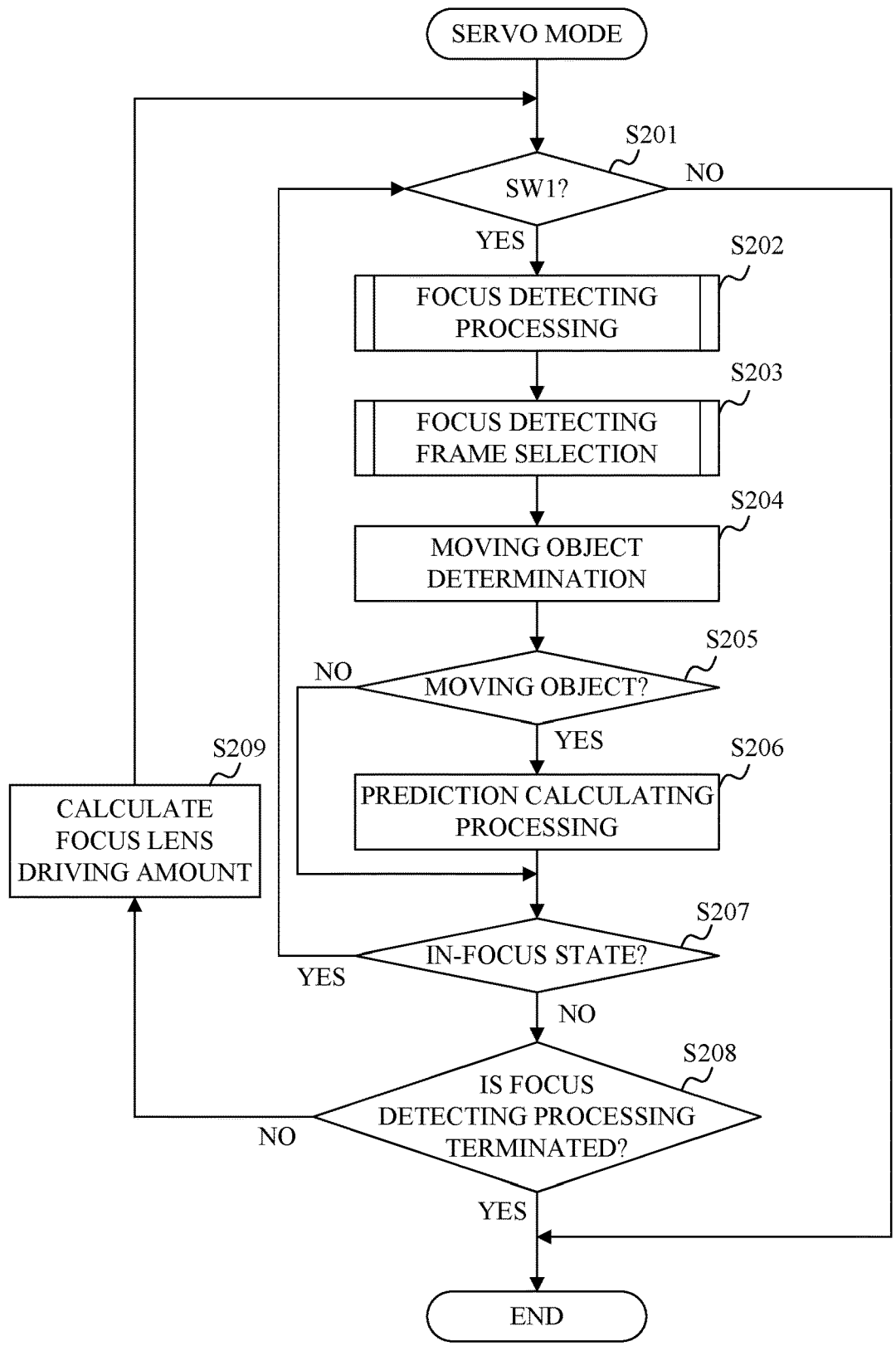
FIG. 2 is a flowchart illustrating servo mode processing according to each embodiment.

Referring now to FIG. 2, a description will be given of imaging processing of the camera body 200, particularly servo mode processing performed by the camera controller 212 including the AF controller 2121. FIG. 2 is a flowchart illustrating servo mode processing.

First, in the step S201, the camera controller 212 determines a state of SW1 (imaging start switch) in the camera operation unit 213. If SW1 is in the ON state, the flow proceeds to the step S202. On the other hand, when SW1 is in the OFF state, the servo mode processing is terminated.

In the step S202, the camera controller 212 (AF signal processor 204) performs focus detecting processing. A detailed description of the focus detecting processing will be given later with reference to FIG. 3. Referring now to FIGS. 4A to 4D, a description will be given of a focus detecting frame for performing the focus detecting processing in the step S202. FIGS. 4A to 4D illustrate an example of a display frame, a focus detecting frame, and a priority area.

FIG. 4A illustrates one focus detecting display frame (display frame). FIG. 4B illustrates that the area corresponding to the focus detecting display frame in FIG. 4A is divided into totally 25 (5×5) focus detecting frames. In this embodiment, as illustrated in FIG. 4B, the area of one row at the center of the 25 focus detecting frames will be designated as a first priority area, and the remaining areas will be designated as a second priority area.

FIG. 4C illustrates one focus detecting display frame (display frame 1) and eight focus detecting display frames (display frame 2) around it. FIG. 4D illustrates the area corresponding to FIG. 4C is divided into totally 81 (9×9) frames. The priority area (first priority area and second priority area) corresponding to the display frame 1 is the same as in FIG. 4B, and a priority area corresponding to the display frame 2 will be set to a third priority area. The priority areas may be changed depending on whether the positional relationship relative to the ground, such as the center, up, or down, or the number of priority areas is variable, for example, the first priority area and the second priority area in FIG. 4D may be set to 3×3 frames. The priority area may be set by a more subdivided row or column unit (such as totally 324 (18×18) frames. In the following description, the divisions and the focus detecting frames in the priority area are set as illustrated in FIGS. 4A to 4D.

Figure 5:
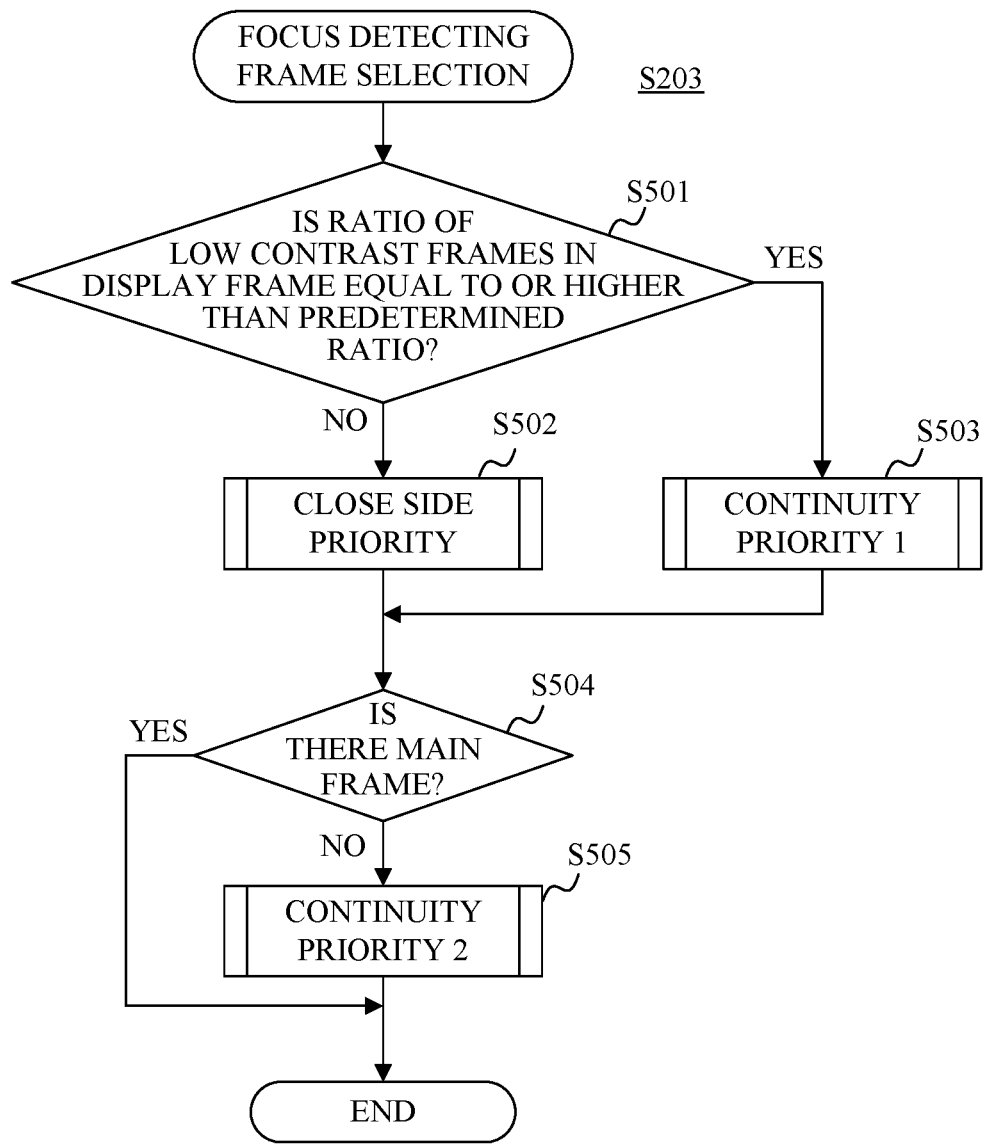
FIG. 5 is a flowchart illustrating a method of selecting the focus detecting frame according to the first and second embodiments.

Next, in the step S203 of FIG. 2, the camera controller 212 performs focus detecting frame selecting processing. Referring now to FIG. 5, a detailed description will be given later of the focus detecting frame selecting processing. Next, in the step S204, the camera controller 212 performs moving object determining processing. The details of the moving body determining processing will be omitted. For example, there is a method of determining whether or not an object image plane position calculated from the imaging time and the defocus amount stored in the memory circuit 215 continuously changes by a predetermined amount, based on the focus detecting result using the focus detecting frame (main frame) determined in the step S203.

Next, in the step S205, the camera controller 212 determines whether or not the object is a moving object by the moving object determining processing in the step S204. If the object is the moving object, the flow proceeds to the step S206. On the other hand, if the object is not the moving object, the flow proceeds to the step S207.

In the step S206, the camera controller 212 (predictor 2124) performs prediction calculating processing using the object image plane position calculated from the imaging time and the defocus amount stored in the memory circuit 215 using the memory 2123, and calculates a future image plane position. Although the details of the prediction method will be omitted, there are a method of using a quadratic curve as a prediction function and a method of obtaining the latest two points and of making a prediction using a linear curve. The prediction expression f(t) represented by the following expression (1) may be obtained by the statistical calculation and the least squares method.

$$f(t) = \alpha + \beta t + \gamma t^n \quad (1)$$

Next, in the step S207, the camera controller 212 determines whether or not the focus state is in the in-focus state. If the focus state is in the in-focus state, the process returns to the step S201. On the other hand, if the focus state is not in the in-focus state, the flow proceeds to the step S208.

In the step S208, the camera controller 212 determines whether or not the focus detecting processing is completed. When the focus detecting processing is completed, the camera controller 212 ends the servo mode processing. On the other hand, if the focus detecting processing has not yet been completed, the flow proceeds to the step S209. One illustrative method of determining whether or not the focus detecting processing has been completed may determine whether the focus lens 103 has scanned the overall drivable range or whether the state will no longer be in-focus even if the focus lens 103 is further moved.

In the step S209, the camera controller 212 calculates a difference between the current position of the focus lens 103 and the image plane position based on the image plane position calculated in the step S206, and calculates a driving amount of the focus lens 103.

Figure 3:
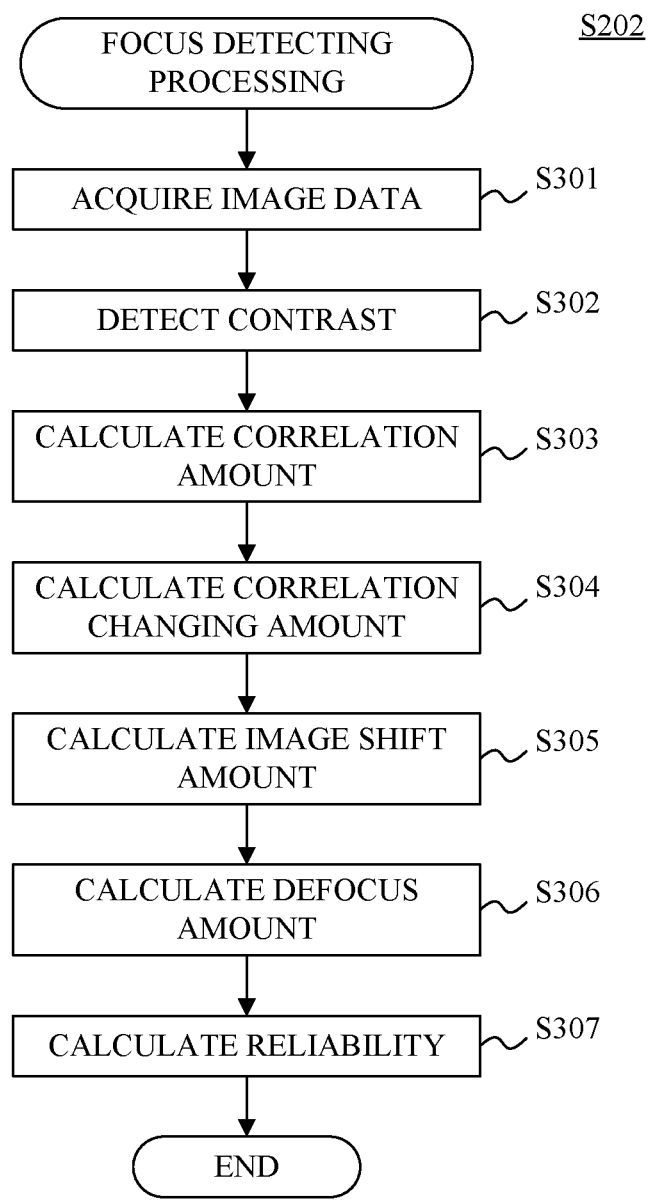
FIG. 3 is a flowchart illustrating focus detecting processing according to each embodiment.

Referring now to FIG. 3, a description will be given of an example of the focus detecting processing (step S202). FIG. 3 is a flowchart illustrating the focus detecting processing. First, in the step S301, the AF signal processor 204 acquires a pair of image signals (image data) as AF signals from a plurality of pixels included in the focus detecting areas of the image sensor 201.

Next, in the step S302, the AF signal processor 204 performs a contrast detection based on peak and bottom information of the image data acquired in the step S301. While the result of the contrast detection can be held as a numerical value, this embodiment discuss a description in which a contrast value equal to or higher than a predetermined contrast value is set to a high contrast, and a contrast value lower than the predetermined contrast value is set to a low contrast.

Next, in the step S303, the AF signal processor 204 calculates a correlation amount between the pair of image signals while shifting the acquired pair of image signals relative to each other every one pixel (1 bit). Next, in the step S304, the AF signal processor 204 calculates a calculation changing amount based on the correlation amount calculated in the step S303. Next, in the step S305, the AF signal processor 204 calculates an image shift amount using the correlation changing amount calculated in the step S304. Next, in the step S306, the AF signal processor 204 calculates a defocus amount of the focus detecting area using the image shift amount of the focus detecting area calculated in the step S305.

Next, in the step S307, the AF signal processor 204 calculates the reliability based on the defocus amount calculated in the step S306. The result of the reliability calculation can be held as a numerical value in the same manner as the result of the contrast detection, but this embodiment uses a predetermined numerical value as a threshold. For example, this embodiment may divide it into four stages: "focus OK" that can be considered to be in-focus, "defocus OK" having a reliable defocus amount, "direction OK" having a reliable defocus direction, and "NG" in which nothing is reliable. The reliability, as used herein, is different from the contrast detected in the step S302, and the "low contrast=low reliability" is not always established. These series of focus detecting processing are performed for each set focus detecting frame, for example, all of 25 frames in case of FIG. 4B.

Referring now to FIGS. 5 to 8, a description will be given of the focus detecting frame selecting processing (step S203). FIG. 5 is a flowchart illustrating focus detecting frame selecting processing (method of selecting the focus detecting frame).

First, in the step S501, the camera controller 212 determines whether or not a ratio of the number of frames (low contrast frames) determined to have low contrasts by the contrast detecting processing in the step S302 to the number of all focus detecting frames in the display frame is equal to or higher than a predetermined ratio. If the ratio of the low contrast frames in the display frame is equal to or higher than the predetermined ratio, the flow proceeds to the step S503. On the other hand, when the ratio of the low contrast frame in the display frame is smaller than the predetermined ratio, the flow proceeds to the step S502.

Figure 8:
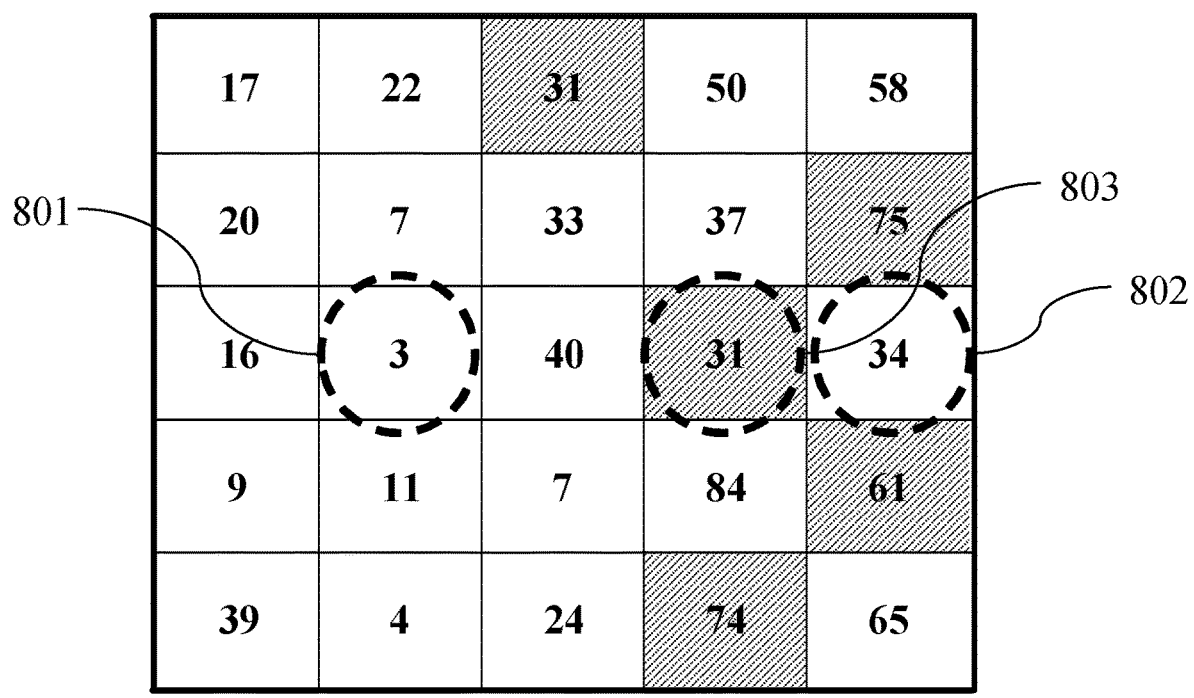
FIG. 8 illustrates an example of a method for selecting the focus detecting frame according to the first embodiment.

FIG. 8 illustrates an illustrative result of the focus detecting processing in the step S202, and corresponds to FIG. 4B. A numerical value described in each focus detecting frame represents the defocus amount, and the smaller the numerical value is, the closer the defocus is. A focus detecting frame represented by diagonal lines indicate a focus detecting frame determined to be a high contrast focus detecting frame (high contrast frame) by the contrast detecting processing in the step S302. In the example of FIG. 8, 5 frames out of all 25 frames are determined to be high contrast frames, and 20 frames are determined to be low contrast frames. Therefore, for example, when the predetermined ratio is set to 70% or higher and the focus detecting result in FIG. 8 is used as an example, the ratio of the low contrast frame is 80% and thus the flow proceeds to the step S503.

Figure 6:
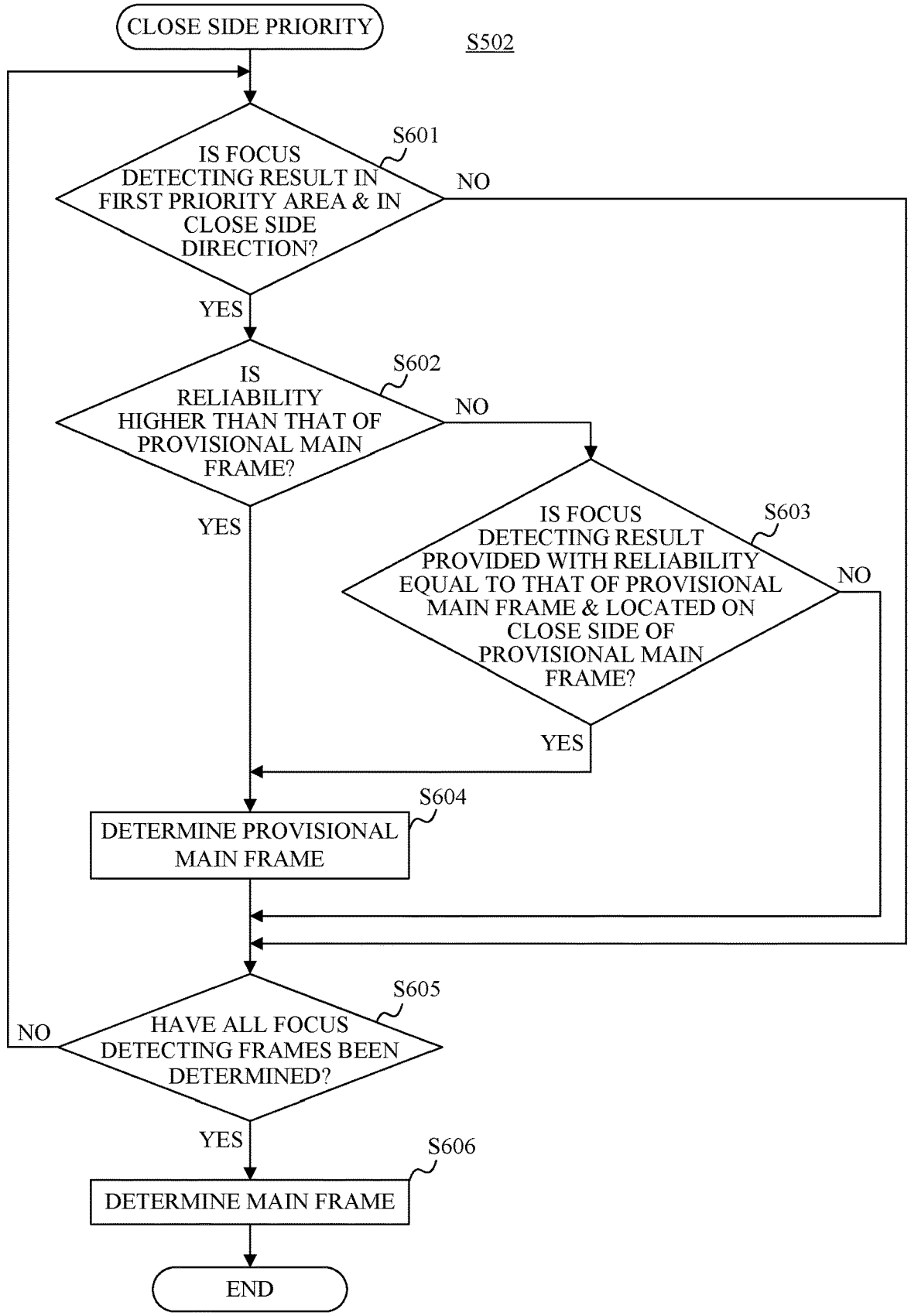
FIG. 6 is a flowchart of close side priority according to the first embodiment.

Referring now to FIG. 6, a description will be given of the close side priority in step S502. First, in the step S601, the camera controller 212 determines whether or not the focus detecting result is included in the first priority area and whether or not the focus detecting result in the close side direction is calculated. The determination of whether or not the focus detecting result in the close side direction is calculated can prevent, even if a plurality of objects are included in the focus detecting frames, a high contrast object in the background direction from being focused. When the focus detecting result is included in the first priority area and the focus detecting result in the close side direction is calculated, the flow proceeds to the step S602. On the other hand, if the focus detecting result is not included in the first priority area or the focus detecting result in the closest direction is not calculated, the flow proceeds to the step S605.

In the step S602, the camera controller 212 determines whether or not the reliability calculated in the step S307 is higher than that of the provisional main frame. If it is determined that the reliability is higher, the flow proceeds to the step S604, and the provisional main frame is updated (determined). On the other hand, if it is determined that the reliability is lower, the flow proceeds to the step S603. In the step S603, the camera controller 212 determines whether or not the reliability is equal to that of the provisional main frame and the focus detecting result (defocus) on the close side of the provisional main frame is calculated. If the reliability is equal to that of the provisional main frame and the focus detecting result on the close side of the provisional main frame is calculated, the flow proceeds to the step S604 and the provisional main frame is updated. On the other hand, if the reliability is different from that of the provisional main frame, or if the focus detecting result is on the close side of the provisional main frame has not been calculated, the flow proceeds to the step S605.

In the step S605, the camera controller 212 determines whether or not the determination in the step S601 has been performed for all focus detecting frames, and repeats the steps S601 to S605 until the determinations for all focus detecting frames are completed. When determinations of all focus detecting frames are completed, the flow proceeds to the step S606. In the step S606, the camera controller 212 determines the provisional main frame as the main frame, and ends this processing.

The close side priority allows the user to focus on the closest object captured in the focus detecting frame regardless of the position of the focus lens 103. Hence, the close side priority is an effective selecting method when the object has not been captured just after the SW1 is started or when focusing is made from an object at infinity to an object at a close distance.

Figure 7A:
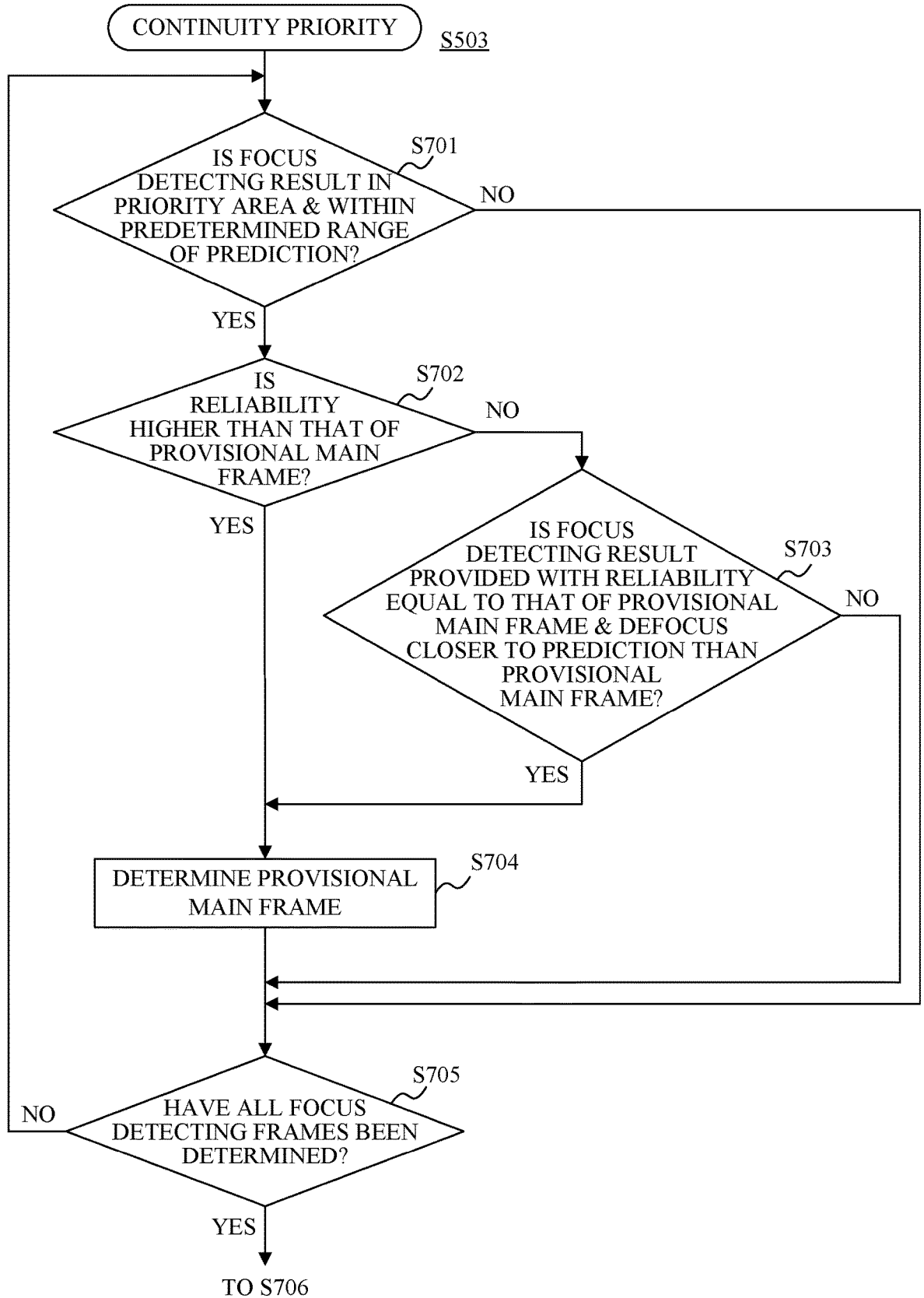
FIGS. 7A and 7B show a flowchart of continuity priority according to each embodiment.
Figure 7B:
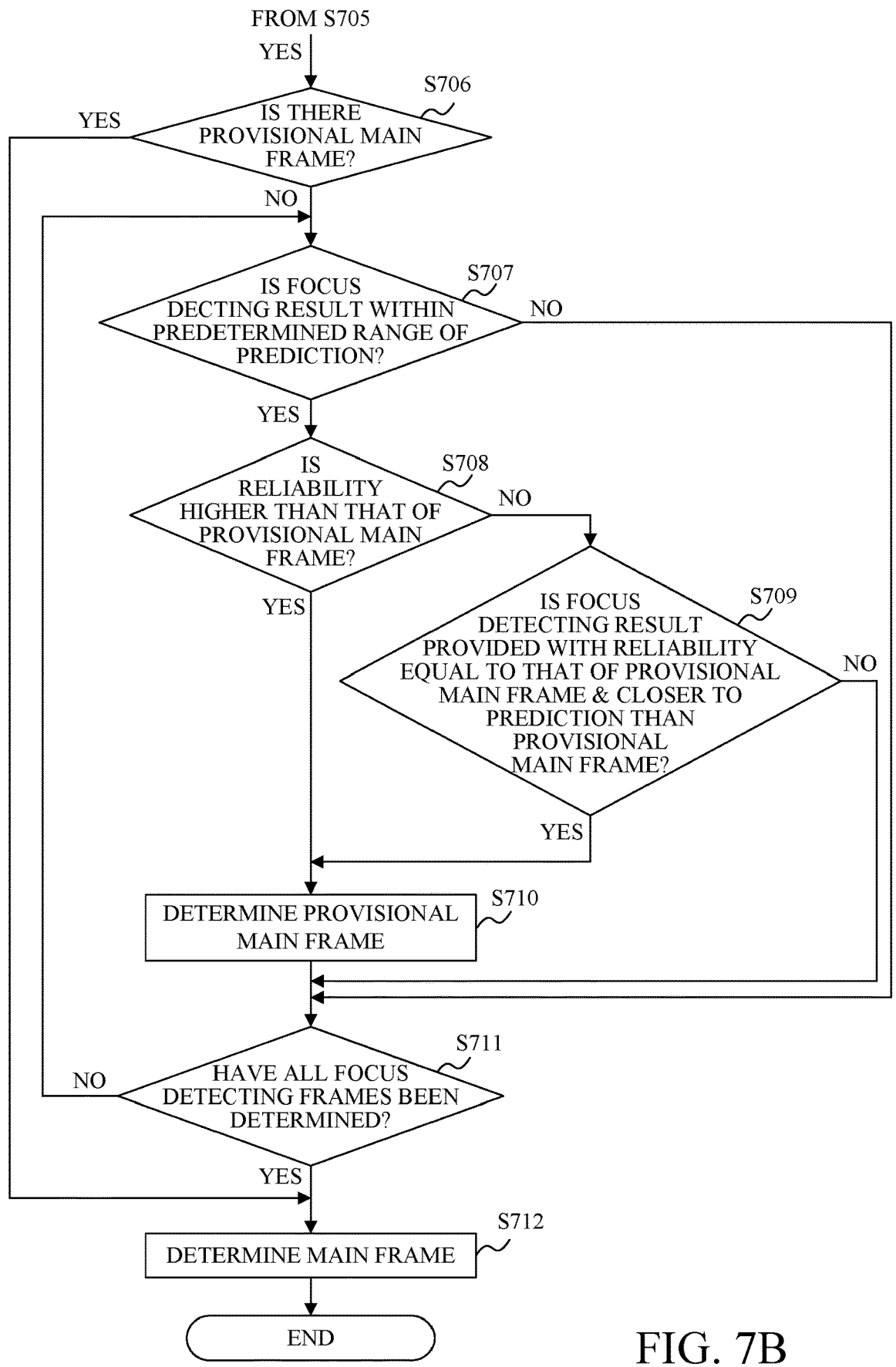

Referring now to FIGS. 7A and 7B, a description will be given of continuity priority (continuity priority 1) in the step S503. FIGS. 7A and 7B illustrate a flowchart of the continuity priority.

First, in the step S701, the camera controller 212 determines whether or not the focus detecting result is in the priority area and whether or not the focus detecting result is within a predetermined range of the prediction. Here, the predicted position is a result calculated by the prediction calculating processing in the step S206. If the object is not determined to be a moving object, it will be the current lens position. A threshold used to determine whether or not it is in a priority area is made different using the timing of the continuity priority so that it is higher than that of the first priority area in the step S503 (continuity priority 1), and higher than that of the second priority area in the step S505 (continuity priority 2) described later. The predetermined range of the prediction can be made different depending on the timing of the continuity priority. In this case, the continuity priority in the previous stage is set to have a narrower predetermined range. If the focus detecting result is in the priority area and is within a predetermined range of the prediction, the flow proceeds to the step S702. On the other hand, if the focus detecting result is not in the priority area or is not within a predetermined range of the prediction, the flow proceeds to the step S705.

In the step S702, the camera controller 212 determines whether or not the reliability calculated in the step S307 is higher than that of the provisional main frame. If it is determined that the reliability is higher, the flow proceeds to the step S704, and the camera controller 212 updates (determines) the provisional main frame. On the other hand, if it is determined that the reliability is lower, the flow proceeds to the step S703. In the step S703, if the reliability is equal to that of the provisional main frame and the defocus is calculated which is closer to the prediction than the provisional main frame, the flow proceeds to the step S704, and the camera controller 212 updates the provisional main frame. On the other hand, if the reliability is not equal to that of the provisional main frame, or if the defocus is not calculated which is closer to the prediction than the provisional main frame, the flow proceeds to the step S705.

In the step S705, the camera controller 212 determines whether or not the determination in the step S701 has been made for all focus detecting frames. If the determination has not been made for all focus detecting frames, the steps S701 to S705 are repeated. On the other hand, if the determination for all focus detecting frames has been completed, the flow proceeds to the step S706. In the step S706, the camera controller 212 determines whether or not the provisional main frame is determined within the priority area. If the provisional main frame has been determined, the flow proceeds to the step S712, and the camera controller 212 determines the provisional main frame as the main frame and ends this flow. On the other hand, if the provisional main frame has not been determined, the flow proceeds to the step S707, and it is determined whether or not the focus detecting result is within a predetermined range of the prediction. As described above, the predetermined range here can be set wider than that of the step S701. Since the steps S708 to S711 are similar to the steps S702 to S705, respectively, a description thereof will be omitted. The continuity priority is an effective selecting method when the object is captured and then continuously followed, and especially when prediction is used.

Next, in the step S504 in FIG. 5, the camera controller 212 determines whether or not there is a main frame determined by the close side priority in the step S502 or the continuity priority 1 in the step S503. If the main frame exists, this process ends. On the other hand, if the main frame does not exist, the flow proceeds to the step S505 of the continuity priority 2. As described above, the continuity priority 2 in the step S505 has a concept of the priority area and a different threshold within a predetermined range of the prediction, and the processing flow is similar and thus a description thereof will be omitted.

Assume that as a result of the above focus detecting frame selection, the predicted position calculated by the prediction calculating processing in the step S206 is "35" in the example of FIG. 8. Without the step S501, the focus detecting frame 801 used to calculate the closest defocus in the first priority area by the close side priority is selected as the main frame.

If the object significantly moves in the close side direction, or if the close object is reframed, there is no problem in driving the lens based on the defocus result "3." However, in this example, since this focus detecting frame is a low contrast focus detecting frame, the result is highly likely to be affected by scattering. When the focus lens is driven using this focus detecting frame as the main frame, focusing may become unstable because the continuity is low for "35." However, if the step S501 can determine that the ratio of the low contrast frame is equal to or higher than the predetermined value, the focus detecting frame 802 can be selected by the continuity priority, and the focus lens can be continuously and stably driven.

As described above, in this embodiment, the control apparatus (camera body 200) includes a calculation unit (AF signal processor 204) and a selection unit (AF controller 2121). The calculation unit calculates a plurality of defocus amounts corresponding to a plurality of focus detecting frames obtained by dividing the area corresponding to the display frame (focus detecting display frame). The selection unit selects one focus detecting frame corresponding to one defocus amount used for an AF control from among a plurality of focus detecting frames. The selection unit changes an AF operation for selecting one focus detecting frame based on the ratio of the number of low contrast frames (frames determined to have low contrasts by the contrast detecting processing) to the number of a plurality of focus detecting frames. The selection unit may change the AF operation based on whether or not the ratio is equal to or higher than a predetermined ratio. When the ratio is equal to or higher than the predetermined ratio, the selection unit may change the AF operation from the close side priority method to another priority method (such as the continuity priority method). The other priority method is, for example, a continuity priority method, but is not limited to this example.

Thus, this embodiment can provide a stable AF operation by switching the AF operation according to the ratio between high contract focus detecting results and low contrast focus detecting results.

Second Embodiment

Figure 9:
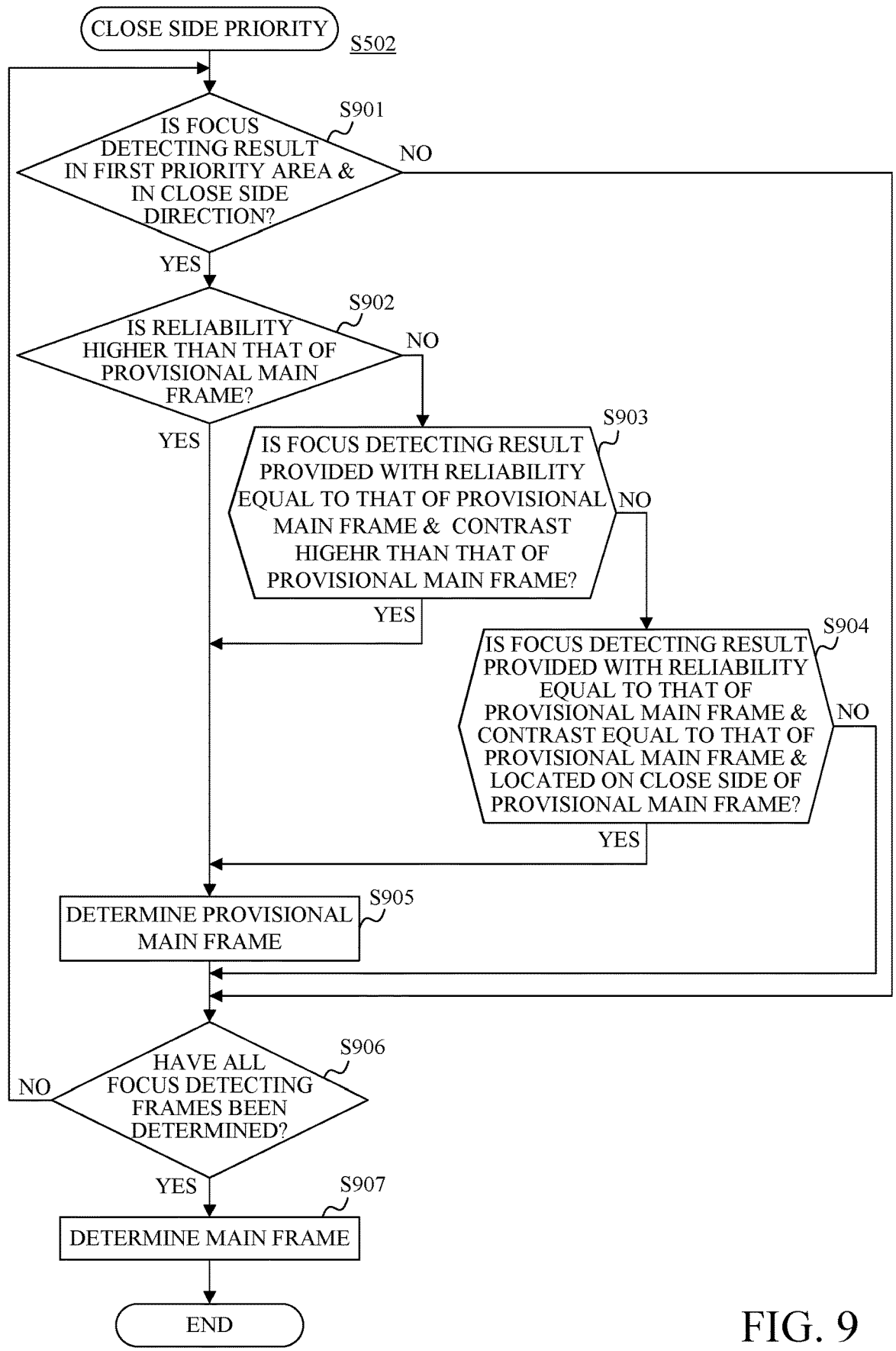
FIG. 9 is a flowchart of close side priority according to the second embodiment.

Referring now to FIG. 9, a description will be given of a second embodiment of the disclosure. FIG. 9 is a flowchart illustrating the close side priority in this embodiment. FIG. 9 is different from FIG. 6 in that the high contrast focus detecting frame is selected in the step S903.

Whether or not the contrast is high may be determined by the numerical value, or the result determined to be high contrast may be prioritized from the high contrast or low contrast result. As described in the first embodiment, the step S901 determines whether or not it is the focus detecting result in the close side direction. Therefore, even if the priority of the high contrast focus detecting frame is enhanced in the step S903, an object having a high contrast in the background direction or the like can be prevented from being focused. When the above selection result by the close side priority is applied to the example of FIG. 8, the focus detecting frame 803 "31" is used to calculate the closest defocus among the high contrast frames included in the first priority area.

In this embodiment, the selection unit (AF controller 2121) performs an AF operation for selecting one focus detecting frame so as to prioritize the high contrast frame over the low contrast frame. The AF operation may be the close side priority method. The selection unit may divide the plurality of focus detecting frames into at least two priority areas that include a first priority area and a second priority area.

As described above, even when the step S501 determines that the ratio of the low contrast frames is equal to or lower than the predetermined ratio, if the high contrast focus detecting frame exists in the first priority area, the closest focus detecting result can be selected from the focus detecting frames that little scatter. Thus, this embodiment can provide the stable AF operation by prioritizing the high contrast focus detecting result.

Third Embodiment

Figure 10:
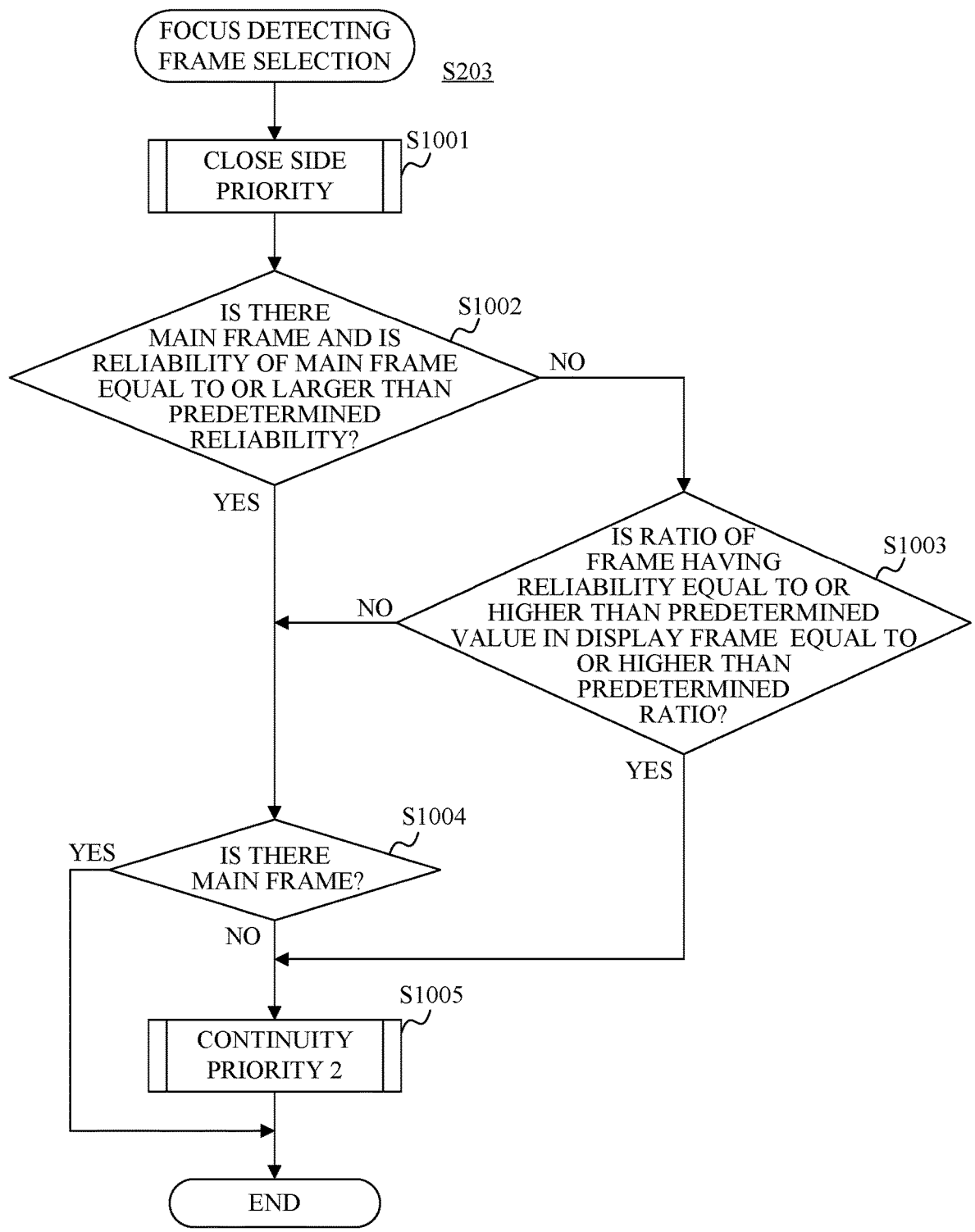
FIG. 10 is a flowchart illustrating a method of selecting the focus detecting frame according to a third embodiment.
Figures 11A, 11B:
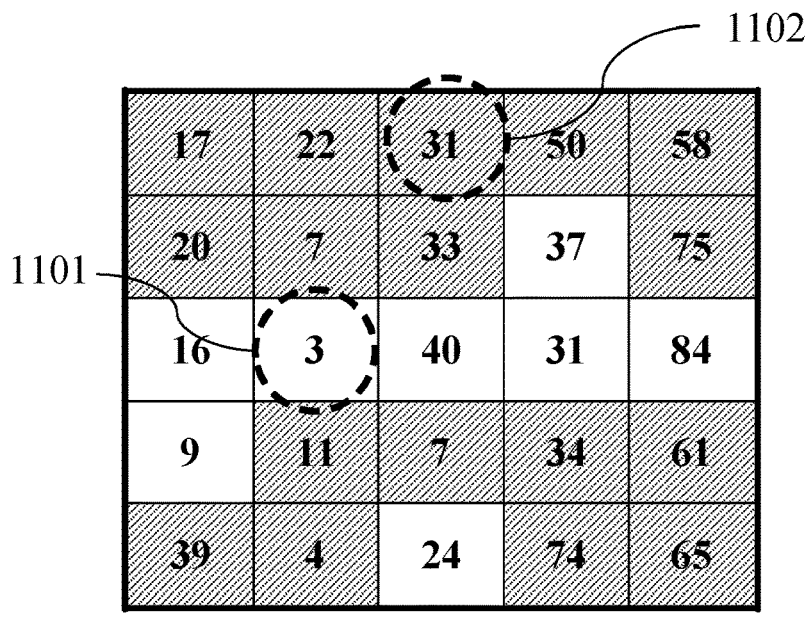
FIGS. 11A and 11B illustrate an illustrative method for selecting the focus detecting frame according to a third embodiment.

Referring now to FIGS. 10, 11A, and 11B, a description will be given of a third embodiment according to the disclosure. FIG. 10 is a flowchart illustrating the focus detecting frame selection (method of selecting the focus detecting frame) according to this embodiment. FIGS. 11A and 11B illustrate an example of a method for selecting the focus detecting frame. FIG. 11A explains an example of the result of the focus detecting processing in the step S202 and an example of selecting the focus detecting frame at that time. FIG. 11A corresponds to FIG. 4B. FIG. 11B corresponds to FIG. 4D.

A numerical value written in each focus detecting frame indicates a defocus amount, and the smaller the numerical value is, the closer the defocus is. The focus detecting frame represented by diagonal lines indicates the focus detecting frame determined to be highly reliable by the reliability calculation in the step S307. The high reliability refers to "focus OK" and "defocus OK" among "focus OK," "defocus OK," "direction OK," and "NG," and is equivalent that the reliability in the steps S1002 and S1003 described later is equal to or higher than a predetermined value. In the example of FIG. 11A, 17 frames out of all 25 frames are determined to be highly reliable and 8 frames are determined to be poorly reliable. In the example of FIG. 11B, 57 frames out of all 81 frames are determined to be highly reliable and 24 frames are determined to be poorly reliable.

First, in the step S1001 in FIG. 10, the camera controller 212 determines the provisional main frame with the close side priority in FIG. 6. In the example of FIGS. 11A and 11B, the focus detecting frame 1101 used to calculate the closest defocus amount in the first priority area is set to the main frame.

Next, in the step S1002, the camera controller 212 determines whether or not the main frame is determined in the step S1001 and the reliability of the selected main frame is equal to or higher than a predetermined reliability. If the main frame exists and the reliability is equal to or higher than the predetermined reliability, the flow proceeds to the step S1004. On the other hand, if the main frame does not exist or the reliability is lower than the predetermined reliability, the flow proceeds to the step S1003. In the example of FIG. 11A, since the reliability of the focus detecting frame 1101 is lower than the predetermined reliability, the flow proceeds to the step S1003.

In the step S1003, the camera controller 212 determines whether or not the ratio of the number of frames whose reliability is determined to be equal to or higher than the predetermined reliability to the number of all focus detecting frames in the display frame is equal to or higher than the predetermined ratio. If the ratio of the number of frames whose reliability is determined to be equal to or higher than the predetermined reliability to the number of all the focus detecting frames in the display frame is equal to or higher than the predetermined ratio, the flow proceeds to the step S1005. On the other hand, if the ratio of the number of frames whose reliability is determined to be equal to or higher than the predetermined reliability to the number of all the focus detecting frames in the display frame is lower than the predetermined ratio, the flow proceeds to the step S1004. For example, when the predetermined ratio is set to 60% or higher and the focus detecting result in FIG. 11A is used for an example, the ratio of the high reliability frame is 68% and thus the flow proceeds to the step S1005.

In the step S1005, the camera controller 212 determines the main frame with the continuity priority 2 described with reference to FIGS. 7A and 7B. In the continuity priority, the focus detecting frame used to calculate the defocus amount closest to the prediction is selected from among the highly reliable focus detecting frames. If it is assumed that the predicted position is "30" and FIG. 11A is used as an example, the focus detecting frame 1102 is set to the main frame.

Assume in an example that there is a third priority area as in the focus detecting result in FIG. 11B. Then, the step S1003 determines the ratio in the total focus detecting results including the first to third priority areas, and the ratio of the highly reliable frames is 70%, the flow similarly proceeds to the step S1005. Since the second priority area is prioritized in the step S701, the continuity priority 2 in the step S1005 determines the main frame from the third priority area when there is no focus detecting result included in the prediction range in the second priority area.

As described above, the close side priority is applied to the first priority area, and the continuity priority is similarly applied to the second and third priority areas, but the result of the second priority area is prioritized in the continuity priority. The reason why the highly reliable focus detecting frame is not prioritized from step S1001 is that the reliability of a blurred object tends to be low. If the initial focusing position is the background, or if a blurred object on the close side is to be focused after the background is in focus once, the focus detecting frame used to calculate the defocus amount for that object cannot be selected.

Thus, in this embodiment, the calculation unit calculates a plurality of defocus amounts corresponding to a plurality of focus detecting frames obtained by dividing an area corresponding to a display frame, and calculates the reliability for each of the plurality of defocus amounts. The area corresponding to the display frame has at least two priority areas that include a first priority area and a second priority area. The selection unit changes the AF operation for selecting one focus detecting frame when the reliability selected from the first priority area is lower than the predetermined reliability and a predetermined ratio or higher of the frame having a reliability higher than the predetermined reliability is included in the area corresponding to the display frame. The selection unit may change the AF operation from the close side priority method to another priority method. The other priority method is, for example, but not limited to, the continuity priority method. The selection unit may perform the close side priority method for the first priority area and the continuity priority method for the second priority area.

Thus, this embodiment switches the AF operation when the reliability of the focus detecting result selected from the first priority area is equal to or lower than the predetermined reliability, and a ratio of focus detecting frames each having a reliability equal to or higher than the predetermined reliability included in the area corresponding to one focus detecting display frame is a predetermined ratio or higher. Therefore, this embodiment provides a stable AF operation.

Fourth Embodiment

Figure 12:
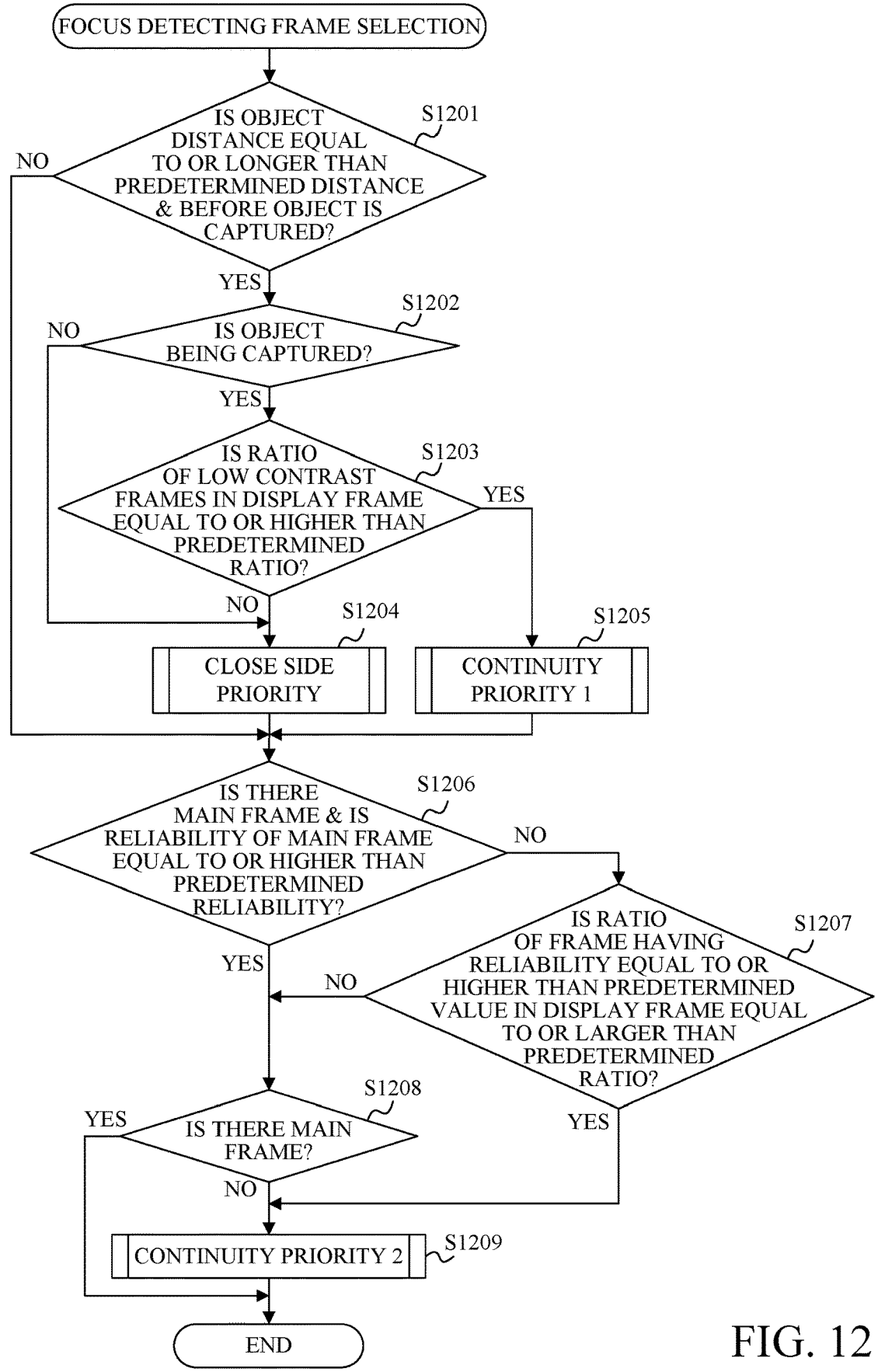
FIG. 12 is a flowchart illustrating a method for selecting the focus detecting frame according to a fourth embodiment.

Referring now to FIG. 12, a description will be given of a fourth embodiment according to the disclosure. FIG. 12 is a flowchart illustrating the focus detecting frame selection (method of selecting the focus detecting frame) according to this embodiment.

First, in the step S1201, the camera controller 212 determines whether the object distance is a predetermined distance or longer, or whether it is in a state before the object is captured. If the object distance is the predetermined distance or longer or it is in the state before the object is captured, the flow proceeds to the step S1202. On the other hand, if the object distance is not the predetermined distance or longer or it is not in the state before the object is captured, the flow proceeds to the step S1206.

In the step S1202, the camera controller 212 determines whether or not the object is being captured. Here, the state in which the object is being captured is a state in which the focus on the main object is within a predetermined depth of focus for a predetermined period or a state in which the focus on the main object is within a predetermined depth of focus has continued a predetermined number of times or more. If the object is being captured, the flow proceeds to the step S1203. On the other hand, if the object is not being captured, the flow proceeds to the step S1204.

In the step S1203, the camera controller 212 makes the same determination as that of the step S501 in FIG. 5, and proceeds to the close side priority in the step S1204 or the continuity priority in the step S1205. The close side priority in the step S1204 is the same as that described with reference to FIG. 9, and the continuity priority in the step S1205 is the same as that described with reference to FIGS. 7A and 7B. The subsequent steps S1206 to S1209 are similar to the steps S1002 to S1005 in FIG. 10, respectively.

This embodiment adds the determination of the object distance and the object capture state. The close side priority is an effective selection method when the object has not yet been captured just after SW1 starts or when the focus is changed from the infinity object to the close object. The continuity priority is an effective selection method when the object is captured and then the image pickup apparatus continuously follows the object, especially using the prediction.

In each embodiment, the selection unit may change the AF operation when the object distance is equal to or longer than a predetermined distance. The selection unit may change the AF operation when the object is captured. The threshold used to determine the continuity in the continuity priority method may differ between the first priority area and the second priority area. The threshold used to determine the continuity in the continuity priority method in the first priority area may be smaller than that in the second priority area.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

Each embodiment can switch, in the servo mode, the AF operation according to the ratio of the high-contrast and low-contrast focus detecting results. Therefore, each embodiment can provide a control apparatus, an image pickup apparatus, a control method, and a storage medium, each of which can provide a stable AF operation.

This application claims the benefit of Japanese Patent Application No. 2020-076366, filed on Apr. 22, 2020 which is hereby incorporated by reference herein in its entirety.

What is claimed is:

1. An apparatus comprising:
at least one processor; and
a memory coupled to the at least one processor, the memory having instructions that, when executed by the processor, performs operations as:
a calculation unit configured to calculate a plurality of defocus amounts corresponding to a plurality of focus detecting frames obtained by dividing an area corresponding to a display frame; and
a selection unit configured to select one focus detecting frame from among the plurality of focus detecting frames, which corresponds to one defocus amount used for an AF (auto focus) control,
wherein the selection unit changes an AF operation for selecting the one focus detecting frame based on a ratio of a number of low contrast frames to a number of the plurality of focus detecting frames.

2. The apparatus according to claim 1, wherein each low contrast frame is a frame determined to have a low contrast by contrast detecting processing.

3. The apparatus according to claim 1, wherein the selection unit changes the AF operation from a close side priority method to another priority method when the ratio is equal to or higher than a predetermined ratio.

4. The apparatus according to claim 1, wherein the selection unit changes the AF operation from a close side priority method to a continuity priority method when the ratio is equal to or higher than a predetermined ratio.

5. The apparatus according to claim 4, wherein the selection unit divides the plurality of focus detecting frames into at least two priority areas that include a first priority area and a second priority area.

6. The apparatus according to claim 5, wherein a threshold used to determine a continuity in a continuity priority method differs between the first priority area and the second priority area.

7. The apparatus according to claim 5, wherein a threshold used to determine a continuity in a continuity priority method in the first priority area is smaller than that in the second priority area.

8. An apparatus comprising:
at least one processor; and
a memory coupled to the at least one processor, the memory having instructions that, when executed by the processor, performs operations as:
a calculation unit configured to calculate a plurality of defocus amounts corresponding to a plurality of focus detecting frames obtained by dividing an area corresponding to a display frame; and
a selection unit configured to select one focus detecting frame from among the plurality of focus detecting frames, which corresponds to one defocus amount used for an AF (auto focus) control,
wherein the selection unit performs an AF operation for selecting the one focus detecting frame so that a high contrast frame is prioritized over a low contrast frame, and
wherein the selection unit performs the AF operation when a ratio of a number of low contrast frames to a number of the plurality of focus detecting frames is equal to or lower than a predetermined ratio.

9. The apparatus according to claim 8, wherein the AF operation is a close side priority method.

10. The apparatus according to claim 1, wherein the selection unit changes the AF operation when an object distance is equal to or longer than a predetermined distance.

11. The apparatus according to claim 1, wherein the selection unit changes the AF operation when an object is being captured.

12. An image pickup apparatus comprising:
the apparatus according to claim 1; and
an image sensor.

13. A method comprising:
calculating a plurality of defocus amounts corresponding to a plurality of focus detecting frames obtained by dividing an area corresponding to a display frame; and
selecting one focus detecting frame from among the plurality of focus detecting frames, which corresponds to one defocus amount used for an AF (auto focus) control,
wherein the selecting changes an AF operation for the selecting the one focus detecting frame based on a ratio of a number of low contrast frames to a number of the plurality of focus detecting frames.

14. The method according to claim 13, wherein the selecting changes the AF operation from a close side priority method to another priority method when the ratio is equal to or higher than a predetermined ratio.

15. A non-transitory computer-readable storage medium storing a program for causing a computer to execute a method, the method comprising:
calculating a plurality of defocus amounts corresponding to a plurality of focus detecting frames obtained by dividing an area corresponding to a display frame; and
selecting one focus detecting frame from among the plurality of focus detecting frames, which corresponds to one defocus amount used for an AF (auto focus) control,
wherein the selection selecting changes an AF operation for the selecting the one focus detecting frame based on a ratio of a number of low contrast frames to a number of the plurality of focus detecting frames.

16. The non-transitory computer-readable storage medium according to claim 15, wherein the selecting changes the AF operation from a close side priority method to another priority method when the ratio is equal to or higher than a predetermined ratio.

* * * * *